(12) United States Patent
Cobb

(10) Patent No.: US 6,871,683 B2
(45) Date of Patent: Mar. 29, 2005

(54) HUB CAP FILTER FOR TIRE INFLATION SYSTEM

(75) Inventor: Bruce V. Cobb, Livonia, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 115 days.

(21) Appl. No.: 10/154,681

(22) Filed: May 24, 2002

(65) Prior Publication Data

US 2002/0139463 A1 Oct. 3, 2002

Related U.S. Application Data

(63) Continuation of application No. 09/770,785, filed on Jan. 26, 2001, now Pat. No. 6,394,159.

(51) Int. Cl.[7] .............................................. B60B 23/10
(52) U.S. Cl. ...................................................... 152/416
(58) Field of Search .......................... 152/416, 417, 152/415; 301/124.1, 108.1

(56) References Cited

U.S. PATENT DOCUMENTS

| | | |
|---|---|---|
| 4,498,709 A | 2/1985 | Wells et al. |
| 4,733,707 A | 3/1988 | Goodell et al. |
| 4,883,106 A | 11/1989 | Schultz et al. |
| 4,932,451 A | 6/1990 | Williams et al. |
| 5,203,391 A | 4/1993 | Fox |
| 5,287,906 A | 2/1994 | Stech |
| 5,377,736 A | 1/1995 | Stech |
| 5,429,167 A | 7/1995 | Jensen |
| 5,538,062 A | 7/1996 | Stech |
| 5,584,949 A | 12/1996 | Ingram |
| 5,769,979 A | 6/1998 | Naedler |
| 6,105,645 A * | 8/2000 | Ingram ........................ 152/415 |
| 6,394,159 B1 * | 5/2002 | Cobb .......................... 152/416 |
| 6,425,427 B1 * | 7/2002 | Stech .......................... 152/417 |
| 6,497,262 B1 * | 12/2002 | Skoff et al. .................. 152/415 |
| 6,510,882 B1 * | 1/2003 | Arvidsson et al. ........... 152/417 |

FOREIGN PATENT DOCUMENTS

| | | |
|---|---|---|
| DE | 2612332 | 3/1976 |
| DE | 3619603 | 6/1986 |
| GB | 492510 | 9/1938 |
| GB | 2178705 | 8/1985 |
| WO | 9216384 | 10/1992 |

* cited by examiner

*Primary Examiner*—Frantz F. Jules
*Assistant Examiner*—Long Bao Nguyen
(74) *Attorney, Agent, or Firm*—Carlson, Gaskey & Olds, PC

(57) ABSTRACT

A vehicle tire inflation system includes an axle assembly with an axle housing having an air supply conduit. Air is provided to the air supply conduit from an air tank mounted on the vehicle. The axle includes least one wheel hub rotatably supported on the axle housing by bearings. A hub cap is mounted at one end of the wheel hub and has an air passageway for conducting an air supply through the hub cap to a tire. A filter is installed within the passageway to remove any debris from the air supply.

19 Claims, 1 Drawing Sheet

HUB CAP FILTER FOR TIRE INFLATION SYSTEM

This application is a continuation of U.S. patent application Ser. No. 09/770,785, filed Jan. 26, 2001 now U.S. Pat. No. 6,394,159.

BACKGROUND OF THE INVENTION

This application relates to a unique hub cap used in wheel end assembly for a tire inflation system. The hub cap includes an internal filtering system for removing contaminants from the air supply before entering the tires.

Tire inflation systems automatically supply air to tires when certain predetermined conditions are met. In a typical situation, the tire inflation system will automatically add air to a tire that becomes under-inflated during vehicle operation. Tire inflation systems include sensors and pressure regulators for monitoring the pressure in each of the vehicle's tires. When pressure in any tire drops below a predetermined level, the system automatically supplies air to that tire until a desired pressure is achieved.

Some systems include check valves for permitting one way air flow, i.e., air flow from the air supply to the tire, so that unwanted tire deflation does not occur. Other systems include valves for permitting two way air flow, i.e. air flow into and out of the tires, so that variable tire pressures can be achieved depending upon the type of terrain over which the vehicle will travel. For example, on hard surfaces such as packed dirt or concrete a higher tire pressure is preferred whereas on surfaces such as sand or mud a lower tire pressure is preferred for increased traction. Usually the tire inflation systems also include an unloader valve that prevents air from being supplied to a tire if there is a blowout.

The tire inflation systems include an air tank that is mounted on the vehicle. Air is supplied from the tank to the tires by using various methods. All inflation systems must include a rotary connection that allows air to be supplied to the tires during rotation. Some systems include a rotary valve mounted on one end of the axle. In theses systems, air is supplied from the tank to the interior of the axle. Air from inside the axle passes through the rotary valve and is conducted to the tires. Another system supplies air via a hub that is rotatable supported on the axle. Rotary seals are used to provide a sealed environment for air conduction.

When vehicles operate off-road under severe conditions, the air supply can become easily contaminated with dirt particles and other debris, which can clog air supply system components. Air filtering systems are required to remove any contaminants from the air before entering the tires. Current air filters are located with the axle housing. This location is undesirable because it is difficult to replace and/or remove the filters.

Thus, it is desirable to have a wheel end assembly for a tire inflation system that provides a simplified air filtering system that can be easily installed and which utilizes an air filter that is easily accessible for removal, replacement, or cleaning.

SUMMARY OF THE INVENTION

A wheel end assembly for a vehicle tire inflation system includes a wheel hub that is rotatably supported on an axle member and a hub cap mounted for rotation with the wheel hub. The axle includes an air supply conduit for conducting an air supply to a passageway formed within the hub cap. The passageway has an inlet in communication with the air supply conduit and an outlet in communication with at least one pneumatic tire. A filter is mounted within the passageway between the inlet and the outlet to remove debris from the air supply. The purified air is supplied to the tire via a tire inlet.

In the preferred embodiment, the hub cap has an inner wall, an outer wall and a flange positioned between the inner and outer walls. The filter is mounted within the hub cap between the inner wall and the flange. The flange preferably has a smaller diameter than the outer wall to create a peripheral gap about the inner circumference of the hub cap. The peripheral gap forms a portion of the passageway between the inlet and the outlet.

In a further preferred embodiment, the hub cap includes a circumferential lip that is in abutting contact with an outer face of the wheel hub at a first axial location. The hub cap defines an inner space between an end of the axle member and the hub cap at a second axial location. Finally, the air supply conduit extends into a seal in the end of the axle member at a third axial location where the third axial location is intermediate the first and second axial locations. The filter is mounted within the inner space at the second axial location such that the hub cap provides air purification at a location axially outward from the wheel hub.

By providing a hub cap with an internal air filter for removing debris from the air supply before entering the tires, the subject invention presents a simplified filtering system that is easy to install. Moreover, the use of an air filter within the hub cap provides easy access for removal, repair, and cleaning.

DETAILED DESCRIPTION OF THE PREFERRED EMBODIMENT

Figure 1:
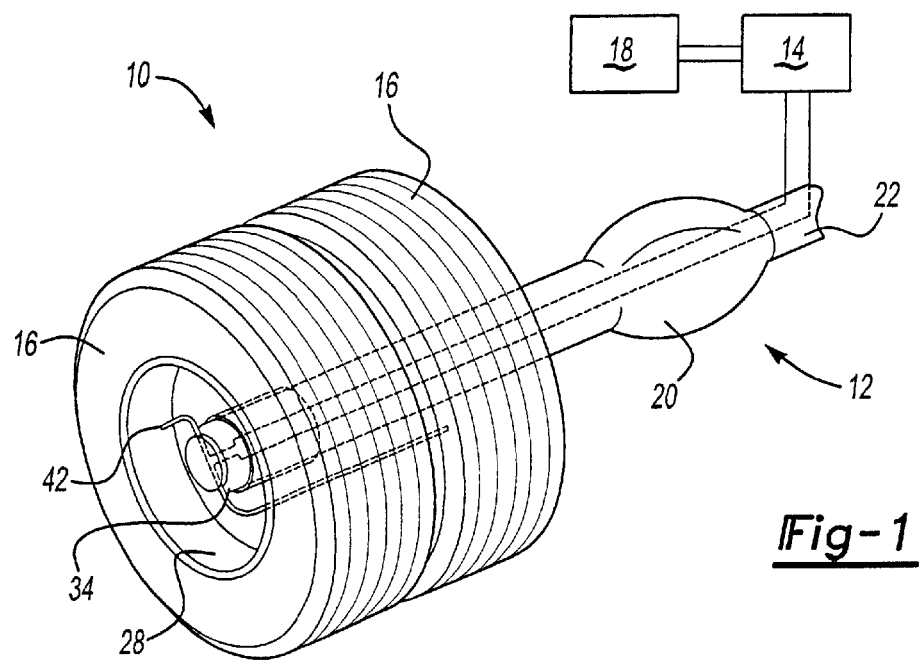
FIG. 1 is a perspective view, partially cut-away, of a wheel end assembly incorporating the inventive hub cap.

As shown in FIG. 1, a wheel end assembly 10 is mounted to an axle 12. A tire inflation system, shown schematically at 14, is installed in a vehicle and supplies air to tires 16 when certain pre-determined conditions are met. For example, if a tire pressure falls below a certain level, the tire inflation system 14 can automatically supply air from an air tank 18 to the tire 16 until the desired tire pressure is achieved. The tire inflation system 14 can be any of various systems known in the art.

The wheel end assembly 10 is mounted on one end of the axle 12. It should be understood that the axle 12 has a second wheel end assembly mounted on the opposite end of the axle 12, however, only one wheel end assembly 10 is shown for description purposes. In the preferred embodiment, the axle 12 includes a housing 20 which can have an internal conduit 22 that routes air from the inflation system 14 through the axle housing 20.

Figure 2:
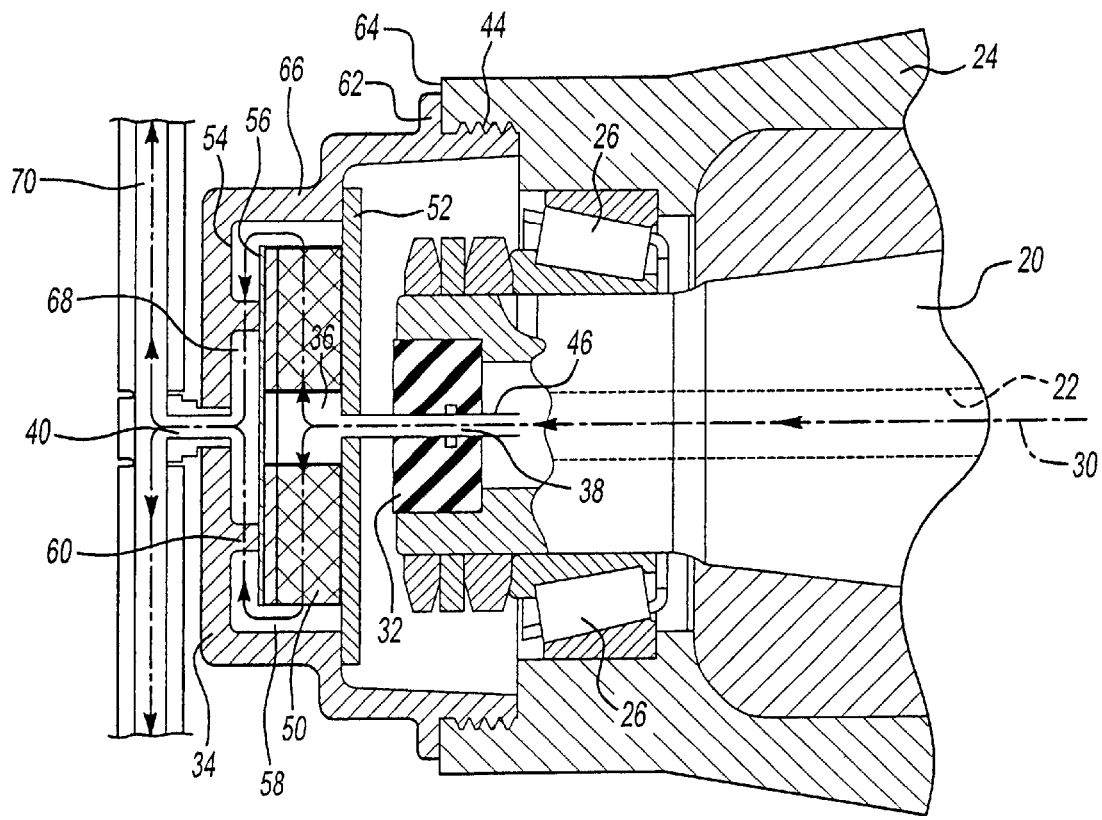
FIG. 2 is a cross-sectional view of a wheel end assembly incorporating the hub cap.

A wheel hub 24 is rotatably mounted on an end of the axle 12 with bearings 26, shown in FIG. 2. Rims 28 are mounted to the hub 24 and the tires 16 are mounted on the rims 28. The hub 24 defines an axis of rotation 30 about which the tires 16 rotate. As shown in FIG. 1, the axle 12 has two (2) tires 16 mounted at one end. It should be understood that the subject invention could also be used on an axle configuration where only one tire 16 was mounted on a rigid axle end or steerable axle end.

A rotary plug or seal 32 is inserted into one end of the axle 12 to seal an end of the air supply conduit 22. A hub cap 34 is installed on the wheel hub 24 and includes a passageway 36 extending through the body of the hub cap 34. The inflation system 14 supplies air through the air supply conduit 22 through the passageway 36 in the hub cap 34 to the vehicle tires 16.

The passageway 36 includes an inlet 38 that communicates with the air supply conduit 22 and an outlet 40 that communicates with a tire valve 42. The hub cap 34 may be circular in shape and the passageway 36 extends through the hub cap 34.

The wheel end assembly 10 includes the wheel hub 24 that is rotatably supported on the axle 12 with the air supply conduit 22. The hub cap 34 is mounted for rotation with the wheel hub 24 via a threaded connection 44 or by fasteners (not shown).

In the preferred embodiment a tube 46 is inserted partially into the inlet 38 of the passageway 36. One end of the tube 46 is inserted into the hub cap 34 and the opposite end of the tube 46 is inserted into the seal 32. The tube 46 spins on an O-ring (not shown) mounted in the seal 32. The tube 46 can be press-fit or glued into the hub cap 34, or other methods known in the art could be used to attach the tube 46 and hub cap 34.

A filter 50 is mounted within the passageway 36 between the inlet 38 and the outlet 40 for removing debris from the air supply. Any type of filter or filtering material known in the art can be installed within the passageway 36 to remove the debris. In the preferred embodiment, the hub cap 34 includes an inner wall 52, an outer wall 54 and a flange 56 positioned between the inner 52 and outer 54 walls. The filter 50 is securely mounted within the hub cap 34 between the inner wall 52 and the flange 56.

In this instance, the flange 56 has a smaller diameter than the outer wall 54 creating a peripheral gap 58 about the inner circumference of the hub cap 34. The peripheral gap 58 forms a portion of the passageway 36 between the inlet 38 and the outlet 40. The inlet 38 is centrally located within the inner wall 52 and the outlet 40 is centrally located within the outer wall 54 such that the air supply flows from the inlet 38, through the filter 50 to the peripheral gap 58, and then to the outlet 40. A mounting portion 60 extends from the outer wall 54 to the flange 56 to properly position the flange 56 to allow adequate air flow through the passageway 36. The flange 56 can be integrally formed with the hub cap 34 as one piece, or can be formed as part of the filter 50 and mounted to the mounting portion 60.

The positioning of the filter 50 within the hub cap 34 allows for easy access to the filter 50 for regular maintenance including cleaning, repair, or replacement. Filter is installed axially outward from the axle end to accomplish this goal. The hub cap has a circumferential lip 62 that abuts against an outer face 64 of the wheel hub 24 at a first position along the axis 30. A side wall 66 extends from the outer wall 54 to the circumferential lip 62 to form an enclosed inner space 68 between the inner 52 and outer 54 walls. This inner space 68 between an end of the axle member 12 and the hub cap 34 is located at a second position along the axis 30. The air supply conduit 22 extends into the seal 32 in the end of the axle housing 20 at a third position along the axis 30 where the third position is intermediate the first and second positions. The filter 50 is mounted within the inner space 68 at the second position such that the hub cap 34 provides air purification at a location axially outward from the wheel hub 24. The purified air flows through the outlet 40 into a conduit 70 that leads to the tire valve 42.

The hub cap 34 is preferably cast as a single piece from steel, however, other known manufacturing methods could be used. While steel is the preferred material, it should be understood that the hub cap 34 could be formed from aluminum, plastic, fiberglass, or other materials.

The subject invention provides a simplified filtering system that utilizes a hub cap 34 with an internal air filter 50 for removing debris from the air supply before entering the tires 16. Moreover, the use of an air filter 50 within the hub cap 34 provides easy access for removal, repair, and cleaning.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. A wheel end assembly for a vehicle tire inflation system comprising:
   a non-rotating axle component;
   a wheel end component rotatably supported on said non-rotating axle component for rotation about an axis;
   at least one pneumatic tire mounted for rotation with said wheel end component about said axis;
   a conduit having a first end in fluid communication with an air supply and a second end in fluid communication with said pneumatic tire; and
   a filter in fluid communication with said conduit and mounted for rotation with said wheel end component wherein said filter removes debris from air supplied through said conduit prior to entering said pneumatic tire.

2. An assembly as set forth in claim 1 wherein said wheel end component comprises a hub cap having an inner surface defining an enclosed inner space between said hub cap and said non-rotating axle component, said enclosed inner space comprising a portion of said conduit.

3. An assembly as set forth in claim 2 wherein said filter is mounted within said enclosed inner space.

4. An assembly as set forth in claim 3 wherein said filter is circumferentially spaced apart from said inner surface of said hub cap to form a peripheral gap.

5. An assembly as set forth in claim 3 wherein said hub cap and said filter are concentric with said axis.

6. An assembly as set forth in claim 1 wherein said wheel end component comprises a hub cap mounted for rotation with a wheel hub about said axis and wherein said hub cap includes a passageway that forms a portion of said conduit between said first and second ends, said passageway including a hub cap inlet in fluid communication with said first end of said conduit and a hub cap outlet in fluid communication with said second end of said conduit.

7. An assembly as set forth in claim 6 wherein said hub cap includes an inner wall, an outer wall laterally spaced from said inner wall along said axis, and a flange positioned between said inner and outer walls, said filter being mounted within said hub cap between said inner wall and said flange.

8. An assembly as set forth in claim 7 wherein said hub cap includes a side wall extending laterally from said outer wall to said inner wall and wherein said filter has a smaller diameter than said side wall creating a peripheral gap about the inner circumference of said hub cap with said peripheral gap forming a portion of said passageway between said hub cap inlet and said hub cap outlet.

9. An assembly as set forth in claim 3 wherein said hub cap inlet is centrally located within said inner wall and said hub cap outlet is centrally located within said outer wall such that air flows from said hub cap inlet, through said filter to said peripheral gap, and then to said hub cap outlet.

10. A vehicle axle assembly for use with a tire inflation system comprising:

an axle housing;

at least one wheel hub supported by bearings for rotation relative to said axle housing about an axis;

at least one pneumatic tire mounted for rotation with said wheel hub about said axis;

a conduit in fluid communication with an air supply wherein said conduit guides air from the air supply to said pneumatic tire;

a hub cap mounted to an outboard end of said wheel hub to define an enclosed inner space between said axle housing and said hub cap wherein said enclosed inner space forms a portion of said conduit; and a filter fixed for rotation with said hub cap and mounted within said enclosed inner space wherein said filter removes debris from the air supply prior to entering said pneumatic tire.

11. An assembly as set forth in claim 10 wherein said hub cap and said filter are concentric with said axis.

12. An assembly as set forth in claim 10 wherein said hub cap includes an inner wall, an outer wall laterally spaced from said inner wall along said axis, and a flange positioned between said inner and outer walls, said filter being positioned within said hub cap between said inner wall and said flange.

13. An assembly as set forth in claim 12 wherein said hub cap includes a side wall extending laterally from said outer wall to said inner wall and wherein said filter has a smaller diameter than said side wall creating a peripheral gap about the inner circumference of said hub cap with said peripheral gap forming a portion of said conduit between a hub cap inlet and a hub cap outlet.

14. An assembly as set forth in claim 13 wherein said inner walls said outer wall and said flange are all laterally spaced outboard from an end face of wheel hub with said filter being supported by said flange to provide air purification at a location axially outward from said wheel hub.

15. A hub cap for a wheel end in a tire inflation system comprising:

a main body having an inner wall, an outer wall, and a flange positioned between said inner and outer walls;

a side wall extending from said outer wall to said inner wall to form an enclosed inner space between said inner and outer walls;

an air passage having in inlet formed within said inner wall and an outlet formed within said outer wall for conducting an air supply through said main body; and a filter supported by said flange for removing debris from the air supply before exiting from said outlet.

16. A hub cap as set forth in claim 15 including a circumferential lip extending radially outward from said side wall to define a mounting portion for attachment to a rotating wheel end component.

17. A hub cap as set forth in claim 16 wherein said flange is laterally spaced from said circumferential lip in an outboard direction such that said filter is positioned outboard from the rotating wheel end component.

18. A hub cap as set forth in claim 15 wherein said filter has a smaller diameter than said side wall to form a peripheral gap within said enclosed inner space.

19. A hub cap as set forth in claim 18 wherein said inlet is centrally located within said inner wall and said outlet is centrally located within said outer wall such that air flows from said inlet, through said filter to said peripheral gap, and then to said outlet.

* * * * *

UNITED STATES PATENT AND TRADEMARK OFFICE
CERTIFICATE OF CORRECTION

PATENT NO. : 6,871,683 B2
DATED : March 29, 2005
INVENTOR(S) : Cobb

It is certified that error appears in the above-identified patent and that said Letters Patent is hereby corrected as shown below:

Column 4,
Lines 18-33, should read as:
-- A wheel end assembly for a vehicle tire inflation system comprising:
    a non-rotating axle component;
    a wheel end component rotatably supported by bearings on said non-rotating axle component for rotation about an axis, said wheel end component comprising a hub cap mounted for rotation with a wheel hub about said axis;
    a conduit having a first end in fluid communication with an air supply and a second end in fluid communication with a pneumatic tire wherein said hub cap includes a passageway that forms a portion of said conduit between said first and second ends, said passageway including a hub cap inlet in fluid communication with said first end of said conduit and a hub cap outlet in fluid communication with said second end of said conduit; and
    a filter in fluid communication with said conduit and mounted for rotation with said hub cap wherein said filter removes debris from air supplied through said conduit prior to entering the pneumatic tire. --.
Lines 34-38, should read as:
-- An assembly as set forth in claim 1 wherein said hub cap has an inner surface defining an enclosed inner space between said hub cap and said non-rotating axle component, said enclosed inner space comprising a portion of said conduit. --.
Lines 41-43, cancel Claim 6.
Line 46, "claim 6" should read as -- claim 1 --.
Line 63, "the" should read as -- an --.
Line 66, "claim 3" should read as -- claim 8 --.

Column 5,
Lines 4-21, should read as:
-- A vehicle axle assembly for use with a tire inflation system comprising:
    an axle housing;
    at least one wheel hub supported by bearings for rotation relative to said axle housing about an axis;
    a conduit in fluid communication with an air supply wherein said conduit guides air from the air supply to a pneumatic tire;
    a hub cap mounted to an outboard end of said wheel hub to define an enclosed inner space between axle housing and said hub cap wherein said enclosed inner space forms a portion of said conduit; and
    a filter fixed for rotation with said hub cap and mounted within said enclosed inner space wherein said filter removes debris from the air supply prior to entering the pneumatic tire. --.
Line 35, "the" should read as -- an --.

UNITED STATES PATENT AND TRADEMARK OFFICE
CERTIFICATE OF CORRECTION

PATENT NO. : 6,871,683 B2
DATED : March 29, 2005
INVENTOR(S) : Cobb

It is certified that error appears in the above-identified patent and that said Letters Patent is hereby corrected as shown below:

Column 6,
Lines 1-5, should read as:
-- An assembly as set forth in claim 27 wherein said inner wall, said outer wall, and said flange are all laterally spaced outboard from an end face of said wheel hub with said filter being supported by said flange to provide air purification at a location axially outward from said wheel hub. --.
Lines 28-30, should read as:
-- A hub cap as set forth in claim 29 wherein said filter has a smaller diameter than a diameter of said side wall to form a peripheral gap within said enclosed inner space. --.
Line 36, insert:
-- 20. An assembly as set forth in claim 1 wherein said wheel end component comprises said wheel hub rotatably supported on said non-rotating axle component with said bearings, a rim mounted to said wheel hub wherein the pneumatic tire is mountable to said rim, and said hub cap supported for rotation with said wheel hub wherein said filter is mounted within said passageway of said hub cap. --.

Signed and Sealed this

Seventeenth Day of January, 2006

JON W. DUDAS
*Director of the United States Patent and Trademark Office*